United States Patent [19]
Gaudette

[11] Patent Number: 5,615,862
[45] Date of Patent: Apr. 1, 1997

[54] METAL PRECIPITATION COMPOSITION FOR TREATING SPENT DRY FILM STRIPPING SOLUTION

[76] Inventor: Robert M. Gaudette, 42 Lance Ave., Litchfield, N.H. 03103

[21] Appl. No.: 382,615

[22] Filed: Feb. 2, 1995

[51] Int. Cl.⁶ .................. C02F 5/02; C02F 5/08
[52] U.S. Cl. .................. 252/175; 252/60; 252/61; 210/724; 210/725; 210/727; 210/729; 210/730; 210/731
[58] Field of Search .................. 252/175, 177, 252/60, 61; 210/724, 725, 727, 729, 730, 731

[56] References Cited

U.S. PATENT DOCUMENTS

| | | | |
|---|---|---|---|
| 4,049,545 | 9/1977 | Horvath | 210/724 |
| 4,559,143 | 12/1985 | Asada et al. | 210/728 |
| 4,760,014 | 7/1988 | Wong | 210/723 |
| 4,857,206 | 8/1989 | Choo | 210/724 |
| 4,882,070 | 11/1989 | Wardell | 210/727 |
| 4,999,114 | 3/1991 | Choo | 210/724 |
| 5,106,510 | 4/1992 | Rieber | 210/724 |
| 5,182,029 | 1/1993 | Erb | 210/724 |
| 5,200,086 | 4/1993 | Shah et al. | 210/727 |

*Primary Examiner*—Ellen M. McAvoy
*Attorney, Agent, or Firm*—Davis and Bujold

[57] ABSTRACT

A powdered composition for treating spent dry film stripping and/or developing solutions comprising: 10 to 70 percent by weight of an aluminum source, such as aluminum sulfate, aluminum chloride; and 28 to 90 percent by weight of siliceous particulates, such as diatomaceous earth, sodium potassium aluminum silicate or expanded perlite. The powdered composition may also include 3 to 35 percent by weight of a metal precipitation agent, such as trimercapto-s-triazine, sodium dimethyldithiocarbamate, starch xanthate, sodium diethydithiocarbamate and thio red, to precipitate the metal from the spent solutions and/or 0 to 10 percent by weight of a dust-suppression agent such as water or propylene glycol. A method of using the disclosed compositions is also revealed in this application.

22 Claims, 1 Drawing Sheet

METAL PRECIPITATION COMPOSITION FOR TREATING SPENT DRY FILM STRIPPING SOLUTION

FIELD OF THE INVENTION

The present invention relates in general to the effective waste treatment and handling of materials used in the dry film image application process, a process used in the printed circuit board and chemical milling industries. In particular, the present invention relates to a novel composition used to treat the spent stripping and developing solutions (remove plastic and metals) used in the removal of either polymerized or non polymerized dry film that has been applied to a substrate. In addition, the invention is related to a method for treating used (spent) alkaline stripper solutions which is simple to use, provides effective removal of metals and plastic, and does not lead to the buildup of material in equipment associated with the process.

BACKGROUND OF THE INVENTION

Various approaches have been developed to deal with spent alkaline stripping solutions used in the dry film imaging process of circuit board manufacture. The stripping step of dry film imaging requires that the dry film substrate that has been photopolymerized be stripped off the metal substrate. Typically, monoethanolamine and/or a similar aqueous solution(s) is used to perform this step. As a consequence, a solution containing the plastic "dry film" material and various metal components are added into the stripping solution. The problem is to remove the plastic portion from the stripping solution as well as any metal contaminants.

Three basic methods have been developed to treat the used stripper solution. The first approach is to acidify the solution to lower the pH. This precipitates the polymer portion forming a gummy residue that is difficult to remove by an automated process(es). Furthermore, the acidification, even after the precipitated polymer is removed, still contains organic material that may interfere with the separation of the metal contaminants at subsequent operations.

The second approach is to use acidic salts to lower the pH to a range of about 6. While the precipitant of the polymer is easier to deal with in this approach, and may well be automated, a great deal of solids are generated, which now need to be handled and disposed of. If the generated solids do not pass Toxicity Characteristics Leaching Procedure (TCLP) testing, the material will have to be removed as hazardous waste or material. The generation of solids, according to this second approach, is about three times the quantity of solids of the first approach.

The third approach is to use neutral salts. This approach further eases the problems associated with removing the polymer precipitate from the spent stripper solution. However, it leaves a substantial organic component in the solution that interferes with metal decontamination and forms sludge deposits within the equipment.

The waste stream resulting from the manufacture of printed circuit boards contains several constituents resulting from the application of the photoresist to the board substrate and subsequent exposure, development, stripping and washing of the substrate. For instance, in a typical process, these constituents include, e.g. metals such as copper, nickel, and lead, the dry film photoresist that has been removed from the board along with the stripper and the developer solutions. The developing and stripping solutions may be sodium carbonate, sodium hydroxide, monoethanolamine, or alcohol, for example, or any combination thereof as well one or more proprietary combinations and/or formulations, such as 4045 sold by Prata, Inc. of Manchester, N.H., for example. Commercially available fortresses include RISTON 3100 and 3300 Series fortresses (available from E. I. du Pont de Nemours and Company, Inc. under the trade names RISTON 3100 and RISTON 3300) and such components will be familiar to those skilled in the art.

SUMMARY OF THE INVENTION

The present invention relates to a powder for treating spent dry film stripping and/or developing solutions comprised of 10 to 70 percentage by weight of an aluminum source, e.g. aluminum chloride or aluminum sulfate, (hereinafter an "aluminum source"); 28 to 95 percentage by weight of siliceous particulates, such as expanded perlite, sodium potassium aluminum silicate or diatomaceous earth; and 40 percentage by weight or less of a dust-suppression agent, such as water, and/or a metal precipitation agent to precipitate the metal from said spent solutions.

BRIEF INTRODUCTION TO THE DRAWING

The invention will now be described, by way of example, with reference to the accompanying drawing in which FIG. 1 is a flow diagram showing the method of using the composition according to the present invention.

DETAILED DESCRIPTION OF THE INVENTION

Figure 1:
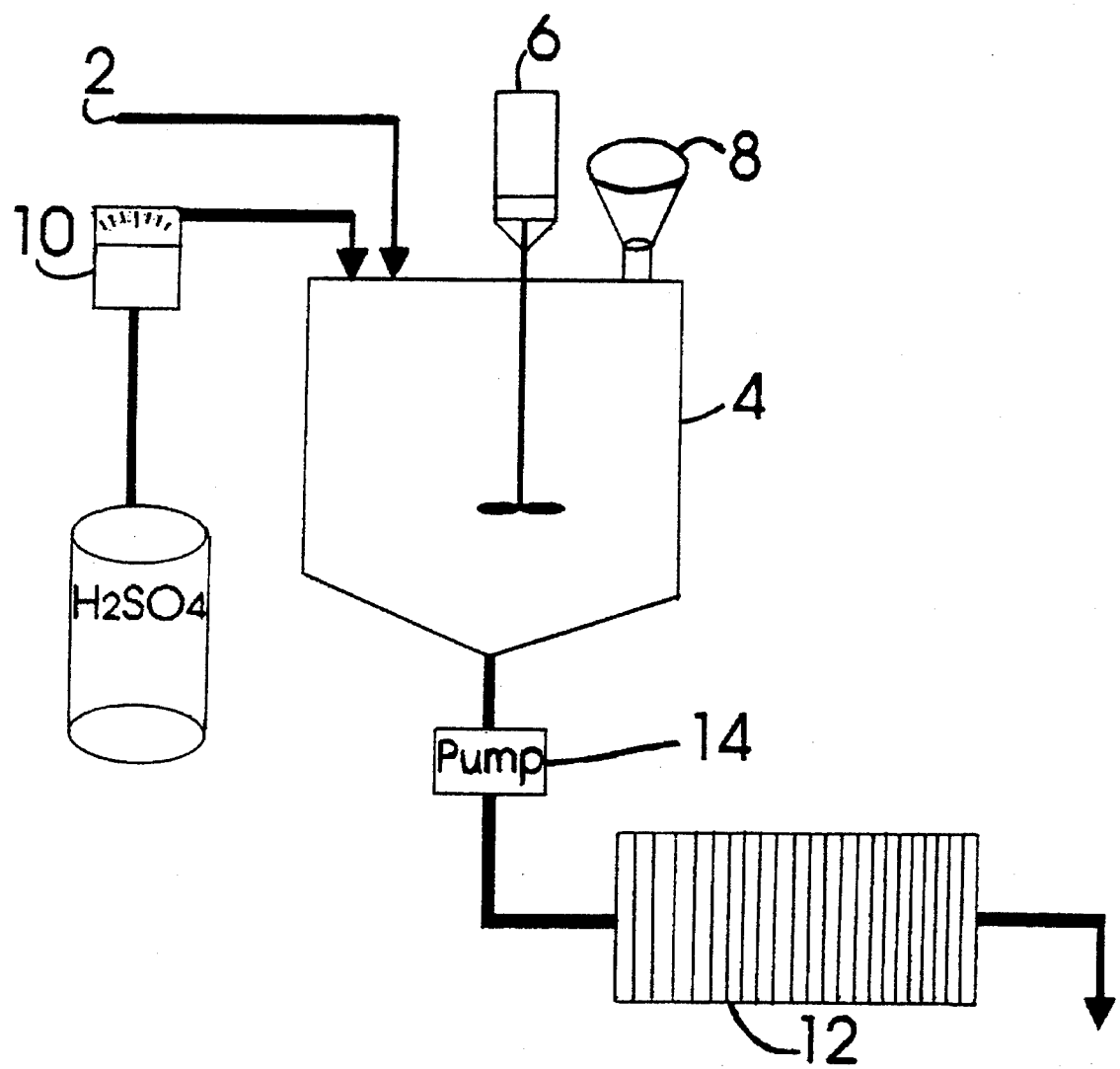

The present invention relates to a powdered composition used to treat stripping solutions used in dry film processing techniques. The powdered composition typically comprises 10 to 70 percentage by weight of an aluminum source; 30 to 90 percentage by weight siliceous particulate; and less than about 10 percent by weight of a dust-suppression agent. Further agents may be employed as well to precipitate metals and/or enhance flocculating of the polymer precipitates formed by the use of the powders in spent stripping and/or developer solutions.

The aluminum source used, according to the present invention, is available from a number of commercial suppliers. The source of the aluminum is not critical to effectiveness of the invention and the aluminum may be supplied, for example, by aluminum sulfate, aluminum chloride, powdered aluminum or a solid aluminum bar or rod, etc.

Siliceous particulates would include diatomaceous earth and expanded perlite. Diatomaceous earth is commercially available from a number of sources including Eagle Pichen Minerals Inc. of Reno, Nev., for example. Expanded perlite is also available from a number of commercial sources including Silbrico Corp. of Hodgkins, Ill., for example.

The dust-suppression agent includes water and various aqueous solutions as well as propylene glycol. Dow Chemical of Midland, Mich., for example, provides a suitable propylene glycol.

Further agents, such as a metal precipitating agent, e.g. trimercapto-s-triazine (e.g. TMT 55 or TMT 15 sold by Degussa Chemical of Ridgefield Park, N.J.), sodium dimethyldithiocarbamate, starch xanthate, thio red and sodium diethydithiocarbamate, may be included in the composition according to the invention. A flocculating agent(s) in an amount of 1 to 20 percentage by weight, such as magnesium hydroxide, may also be employed as part of the composition of the invention.

The powdered compositions of the invention are employed by introducing a spent stripping and/or developing solution 2 into a vessel 4 or some other container and stirring the same by a manual or an automated stirring device 6; adding the desired composition of the invention by a suitable dispensing device 8 so that a concentration of the composition is effective (in general this will be about 1 pound of composition to 40 to 150 gallons of spent stripping solution); adding sufficient acid (e.g. $H_2SO_4$) by a suitable pH control and metering pump 10 to bring the pH of the resultant solution below a pH of about 5; and separating the solids from the solution by use of filtration, e.g. a filter press or another suitable filtering device 12. The treated solution is pumped from the vessel 4 to the filter press 12 by way of a pump 14.

The following Embodiments illustrate various aspects of the invention.

EMBODIMENT 1

A first composition of the invention can be made according to the following formulation:

58 weight percent of siliceous particulates;

38 weight percent of an aluminum source; and 4 weight percent of a dust suppressant.

EMBODIMENT 2

A second composition of the invention can be made according to the following formulation:

38 to 78 weight percent of siliceous particulates;

18 to 58 weight percent of an aluminum source; and 0 to 10 weight percent of water or another liquid to prevent dust.

EMBODIMENT 3

A third composition of the invention can be made according to the following formulation:

48 weight percent of siliceous particulates;

32 weight percent of an aluminum source; and 20 weight percent of trimercapto-s-triazine (TMT) or another suitable metal precipitant.

EMBODIMENT 4

A fourth composition of the invention can be made according to the following formulation:

28 to 68 weight percent of siliceous particulates;

5 to 35 weight percent of trimercapto-s-triazine or another suitable metal precipitant; and 15 to 45 weight percent of an aluminum source.

EMBODIMENT 5

A fifth composition of the invention can be made according to the following formulation:

80 weight percent of siliceous particulates;

20 weight percent of trimercapto-s-triazine or another suitable metal precipitant.

EMBODIMENT 6

A sixth composition of the invention can be made according to the following formulation:

65 to 95 weight percent of siliceous particulates; and 5 to 35 trimercapto-s-triazine or another suitable metal precipitant.

The powdered compositions according to Embodiments 1 and 2 will remove approximately 75 to 85 percent of the metals in the solution to be treated, and all of the dry film, at a usage rate of about 60 gallons per pound. It is to be appreciated that the metal of the removal and usage are dependent on which siliceous particulates are employed in the formulation. The compositions of Embodiments 3–6 using trimercapto-s-triazine (TMT), generally remove metals at a rate of 98 to 100%, dependent upon the metal content of the stripper, the quantity of the composition used, the amount of aluminum in the composition, and the amount of trimercapto-s-triazine (TMT) added to the solution.

Diatomaceous earth is moderately hazardous, especially if inhaled by a user. For safety reasons, sodium potassium aluminum silicate may be substituted in its place without significantly effecting the usefulness of the composition. The solids removed, both polymer and metals will solidify after the filtering/dewatering process.

The compositions, according to the present invention, do not solidify and will not settle out when added to the solution or the fluid to be treated. This feature enhances the ease of use and effectiveness of the composition.

It is to be appreciated that the elements and/or compounds which make up the composition, according to the present invention, may be added separately during the treatment process, e.g. one after another, while still maintaining its effectiveness. Also, the entire composition may not be entirely in powdered form, e.g. it may be partially aqueous or a powder and an aqueous solution combination.

Since certain changes may be made in the above described chemical composition and method of using the same, without departing from the spirit and scope of the invention here and involved, it is intended that all subject matter contained in the above description shall be interpreted merely as illustrating the inventive concepts herein involved and shall not be construed as limiting the invention.

What is claimed is:

1. A composition for treating a spent dry film stripping solution comprising:

10 to 70 percent by weight of an aluminum source;

28 to 95 percent by weight of siliceous particulates;

about 3 to about 35 percent by weight of a metal precipitating agent; and less than about 10 percent by weight of a dust-suppression agent.

2. The composition of claim 1 wherein said dust-suppression agent is water.

3. The composition of claim 1 wherein said dust-suppression agent is propylene glycol.

4. The composition of claim 1 wherein said aluminum source comprises about 38 percent by weight; siliceous particulates comprises about 58 percent by weight; and said dust-suppression agent comprises about 4 percent by weight.

5. The composition of claim 4 wherein said dust-suppression agent is water.

6. The composition of claim 4 wherein said dust-suppression agent is propylene glycol.

7. The composition of claim 1, wherein said aluminum source is chosen from the group consisting of aluminum sulfate, aluminum chloride, powdered aluminum and solid aluminum.

8. A composition for treating a spent dry film stripping solution comprising:

10 to 70 percent by weight of an aluminum source;

28 to 95 percent by weight of siliceous particulates; and about 3 to about 35 percent by weight of a metal precipitating agent, wherein the metal precipitation agent is chosen from the group of metal precipitating agents consisting of trimercapto-s-triazine, sodium dimethyldithiocarbamate, starch xanthate, thio red and sodium diethydithiocarbamate.

9. The composition of claim 8 wherein said composition further includes at least one of a dust-suppression agent and a flocculating agent.

10. The composition of claim 8, wherein said aluminum source is chosen from the group consisting of aluminum sulfate, aluminum chloride, powdered aluminum and solid aluminum.

11. A composition for treating a spent dry film stripping solution comprising:

10 to 70 percent by weight of an aluminum source;

28 to 95 percent by weight of siliceous particulates;

about 3 to about 35 percent by weight of a metal precipitating agent; and a flocculating agent.

12. The composition of claim 11 wherein the flocculating agent is magnesium hydroxide.

13. The composition of claim 11, wherein said composition further includes a dust-suppression agent.

14. The composition of claim 11, wherein said aluminum source is chosen from the group consisting of aluminum sulfate, aluminum chloride, powdered aluminum and solid aluminum.

15. The composition of claim 11, wherein said metal precipitation agent is chosen from the group of metal precipitating agents consisting of trimercapto-s-triazine, sodium dimethyldithiocarbamate, starch xanthate, thio red and sodium diethydithiocarbamate.

16. A composition for treating a spent dry film stripping solution comprising:

20 to 45 percent by weight of an aluminum source;

30 to 90 percent by weight of sodium potassium aluminum silicate;

less than about 10 percent by weight of a liquid dust-suppression agent; and a metal precipitation agent.

17. The composition of claim 16 wherein the metal precipitation agent is chosen from the group of metal precipitating agents consisting of trimercapto-s-triazine, sodium dimethyldithiocarbamate, starch xanthate, thio red and sodium diethydithiocarbamate.

18. The composition of claim 16 wherein said dust-suppression agent is chosen from the group consisting of water and propylene glycol.

19. The composition of claim 16 wherein said aluminum source comprises about 38 percent by weight; sodium potassium aluminum silicate comprises about 58 percent by weight; and said dust-suppression agent comprises about 4 percent by weight.

20. The composition of claim 16 further comprising from 0.1 to about 35 percent by weight of said metal precipitating agent.

21. The composition of claim 16 further comprising magnesium hydroxide as a flocculating agent.

22. The composition of claim 16 used in combination with an acid for lowering the pH of the spent dry film stripping solution to an acidic pH once the metal precipitation agent precipitates out any metal contained in the spent dry film stripping solution.

* * * * *